United States Patent
Ho et al.

(10) Patent No.: US 6,870,837 B2
(45) Date of Patent: Mar. 22, 2005

(54) CIRCUIT EMULATION SERVICE OVER AN INTERNET PROTOCOL NETWORK

(75) Inventors: Chi Fai Ho, Sunnyvale, CA (US); Amar Gupta, Cupertino, CA (US); Prabhas Kejriwal, Palo Alto, CA (US); Ravi Bail Bhat, Bangalore (IN)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/378,201

(22) Filed: Aug. 19, 1999

(65) Prior Publication Data

US 2003/0133461 A1 Jul. 17, 2003

(51) Int. Cl.$^7$ ................................. H04L 12/66
(52) U.S. Cl. ................ 370/356; 370/353; 370/354; 370/355; 370/466; 709/249
(58) Field of Search ................ 370/232, 233, 370/234, 235, 236, 325, 329, 401, 395.5, 395.52, 402, 410, 465, 466, 467, 463, 352, 353, 354, 355, 356; 709/223, 225, 227, 229, 249

(56) References Cited

U.S. PATENT DOCUMENTS

| | | | | |
|---|---|---|---|---|
| 5,999,518 A | * | 12/1999 | Nattkemper et al. | 370/402 |
| 6,064,651 A | * | 5/2000 | Rogers et al. | 370/232 |
| 6,094,437 A | * | 7/2000 | Loehndorf, Jr. et al. | 370/420 |
| 6,157,614 A | * | 12/2000 | Pasternak et al. | 370/236 |
| 6,169,735 B1 | * | 1/2001 | Allen, Jr. et al. | 370/325 |
| 6,438,612 B1 | * | 8/2002 | Ylonen et al. | 709/249 |

FOREIGN PATENT DOCUMENTS

| | | |
|---|---|---|
| EP | 0691769 A1 | 1/1996 |
| EP | 0921666 A2 | 6/1999 |
| WO | 97/27692 A | 7/1997 |

OTHER PUBLICATIONS

"TechEncyclopedia ATM", Copyright 1981–2003, The Computer Language Company http://www.techweb.com/encyclopedia/defineterm?term=atm&x=18&y=7, pp. 7 total.

A. Rubens et al., "Layer Two Tunneling Protocol "L2TP"", ©The Internet Society (1999), Aug. 1999, pp. 1–157.

"Circuit Emulation Service Interoperability Specification Version 2.0", The ATM Forum Technical Committee, af–v–toa–0078.000, Jan. 1997, pp. 93 total.

"Circuit Emulation Service Interoperability Specification AF–SAA–0032.000", The ATM Forum Technical Committee, Sep. 1995, pp. 58 total.

W.M. Townsley et al. "Layer Two Tunneling Protocol "L2TP"" Network Working Group, Internet–Draft, Category, Jun. 1999: Standards Trackl<draft–ietf–pppext–l2tp–16.txt>; http://www.townsley.net/mark/l2tp/l2tp–latest.txt, reprinted Jul. 21, 1999, (71 pages).

"Circuit Emulation Service Interoperability Specification"; The ATM Forum Technical Committee; AF–SAA–0032.000; Sep., 1995.

(List continued on next page.)

*Primary Examiner*—Dang Ton
*Assistant Examiner*—Shick Hom
(74) *Attorney, Agent, or Firm*—Squire, Sanders & Dempsey L.L.P.

(57) ABSTRACT

The present invention establishes a circuit emulation service (CES) over an internet protocol (IP) network based on properties of the IP network. The CES emulates a circuit from a local interworking function to a remote interworking function. Data that is received at a constant bit rate at the local interworking function is encapsulated into a number of IP packets configured according to the CES. The IP packets are transported from the local interworking function to the remote interworking function according to the CES. In one embodiment, each IP packet also includes data segments for simultaneously encapsulating multiple constant bit rate circuits. In another embodiment, each data segment includes a separate CES circuit header.

8 Claims, 8 Drawing Sheets

OTHER PUBLICATIONS

"Circuit Emulation Service Interoperability Specification, Version 2.0"; The ATM Forum Technical Committee; af–v-toa–0078.000; Jan. 1997.

International Search Report mailed Sep. 22, 2000 in counterpart PCT application No. PCT/US00/17152.

Rueffler, D. et al, "A Smart Node Architecture Linking Telephony with the Internet," Proceedings of International Conference on Computer Communication, vol. Conf. 13, Nov. 18, 1997, pp. 77–81, XP000753882.

* cited by examiner

MACHINE
READABLE
MEDIUM
820

MACHINE
EXECUTABLE
INSTRUCTIONS
810

FIG. 8

CIRCUIT EMULATION SERVICE OVER AN INTERNET PROTOCOL NETWORK

FIELD OF THE INVENTION

The present invention pertains to the field of networking. More particularly, this invention relates to circuit emulation services over an internet protocol (IP) network.

BACKGROUND OF THE INVENTION

Over the years, a wide variety of networks have been developed to carry various types of information. Early networks were telephone networks designed with voice communications in mind. These networks were, and still are, primarily circuit-based networks. In a circuit-based network, each call establishes a dedicated, point-to-point connection through the network which, for instance, allows people at both ends of a telephone call to speak and listen at the same time.

A circuit remains open for the entire duration of a call even if no one is speaking. In which case, a large portion of circuit's bandwidth, or capacity to carry information, is wasted on silence, or meaningless data. Time Division Multiplexing (TDM) is a common circuit-based technology. In TDM, analog signals are digitally coded and multiplexed in time over circuits at a constant bit rate.

In recent decades, the wide spread use of computers has led to the development of additional types of networks. These networks have been designed with data communications in mind and are primarily packet-based networks. In a packet-based network, a call may consist of a stream of data sent from one computer to another. The stream of data is divided up into packets before it enters the network. At the destination, the stream of data is re-assembled from the packets.

A packet-based call does not require a dedicated connection through the network. Instead, packets from many different calls can share the same bandwidth. That is, packets from one call can be inserted into spaces between packets from other calls. In which case, packet-based networks efficiently utilize much more network bandwidth than circuit-based networks, making packet-based networks particularly suited to handle the large volumes of data traffic.

Packet-based networks, however, normally do not work well for time critical transmissions such as voice. For instance, in packet-based networks, packets may experience delay variations while traveling through the network. As a result, packets are rarely received at a constant bit rate. In data communications, delay variations between packets usually do not matter. A computer can just wait for a complete set of packets to arrive before processing the data. For time critical transmissions however, delay variations can have a significant impact on the quality of the call. In which case, circuit-based networks like TDM are generally better suited for constant bit rate, time critical transmissions such as voice.

Since packet-based and circuit-based networks are suited to different kinds of data, network carriers often have to maintain more than one kind of network to satisfy client needs. A carrier may need to maintain TDM for voice and/or video, as well as packet-based networks such as frame relay, ATM (asynchronous transfer mode), and IP (internet protocol) for data. In order to reduce the number of networks that must be supported, a network solution is needed that can provide the advantages of both a circuit-based, constant bit rate service and a packet-based, high bandwidth utilization service.

One approach offered by an industry cooperation group, The ATM Forum, is CES (circuit emulation service) over ATM. CES over ATM is described in "Circuit Emulation Service Interoperability Specification," AF-SAA-0032.000, published September 1995, and "Circuit Emulation Service Interoperability Specification Version 2.0," AF-VTOA-0078.000, published January 1997, both available from The ATM Forum at http://www.atmforum.com. CES over ATM establishes a logical path through the ATM network. In this respect, CES over ATM is similar to TDM in that all the data in a circuit follows the same point-to-point path. With a common path, there should be no out-of-order packets.

An ATM path can accommodate multiple circuits. Depending on a data rate needed for a given circuit, different amounts of bandwidth can be assigned to different circuits in a path. As a result, delay variations between packets should be greatly reduced.

Theoretically, CES over ATM eliminates the need for multiple networks because it allows ATM to handle regular data as well as constant bit rate data. ATM, however, has a number of disadvantages and limitations. For instance, ATM is not as widely spread as some other networks. The smaller ATM market share has lead to less research and development directed to future improvements, gaps in ATM availability, especially between regions serviced by different network carriers, and more expensive ATM hardware and technical support. Other limitations include security, in that ATM packet headers cannot be encrypted, and failure recovery, in that data is often lost and re-routing is slow compared to some other networks. For these and numerous additional reasons, CES over ATM is less than an ideal network solution for constant bit rate data transmission.

SUMMARY OF THE INVENTION

The present invention establishes a circuit emulation service (CES) over an internet protocol (IP) network based on properties of the IP network. The CES emulates a circuit from a local interworking function to a remote interworking function. Data that is received at a constant bit rate at the local interworking function is encapsulated into a number of IP packets configured according to the CES. The IP packets are transported from the local interworking function to the remote interworking function according to the CES. In one embodiment, each IP packet also includes data segments for simultaneously encapsulating multiple constant bit rate circuits. In another embodiment, each data segment includes a separate CES circuit header.

Other features and advantages of the present invention will be apparent to those skilled in the art from the accompanying drawings and the detailed description that follows below.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

Figure 1:
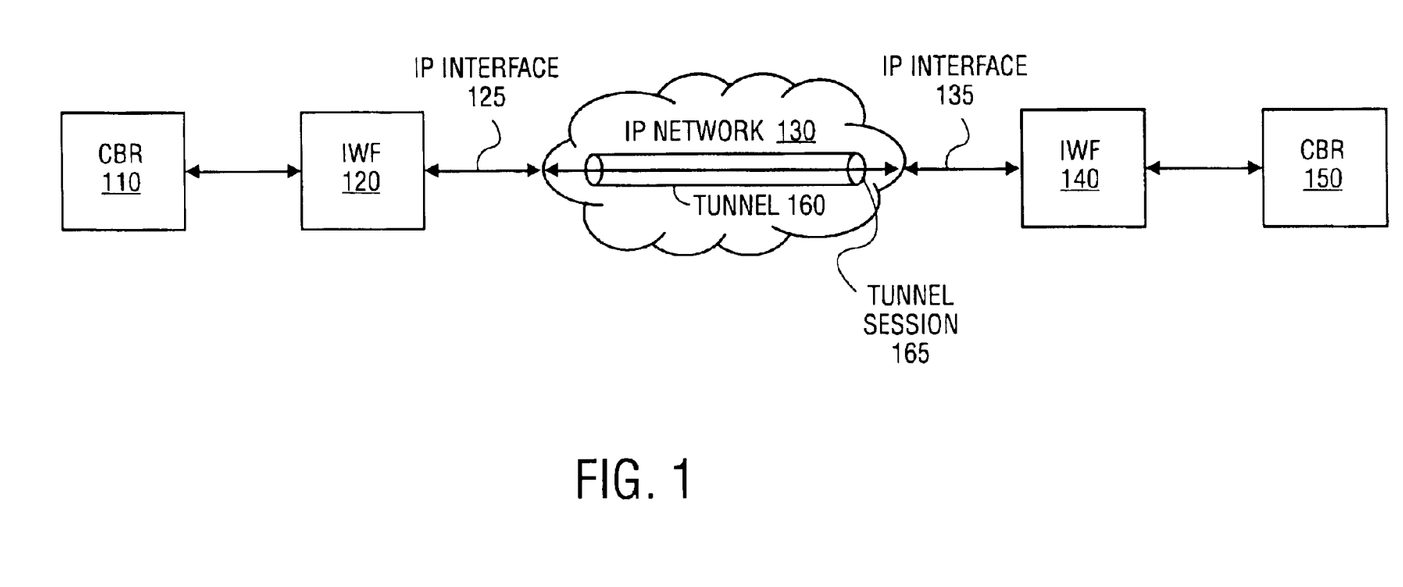
FIG. 1 illustrates one embodiment of a circuit emulation service over internet protocol (CESIP).

FIG. 1 illustrates one embodiment of a circuit emulation service over an internet protocol (CESIP) network according to the teachings of the present invention. As discussed more fully below, CESIP leverages on the many advantages of IP to provide a packet-based network solution for constant bit rate data transmission such as voice and video. Like CES over ATM, CESIP is intended to emulate the circuit-based characteristics of, for example, time division multiplexing (TDM) traffic.

In the illustrated embodiment, constant bit rate (CBR) circuits 110 and 150, interworking functions (IWFs) 120 and 140, and IP network 130 are coupled as shown. CBRs 110 and 150 represent any of a number of data sources having any of a number of signaling rates. For instance, CBR circuits 110 and 150 may represent any type of data traffic, such as video, digitized voice, frame relay, etc., between individual users, local area networks, internet service providers, or virtually any other entity or combination of entities.

Those skilled in the art will be familiar with various signaling rates, such as structured and unstructured digital signal levels DS1, DS3, and NxDS0, and the European equivalents E1 and E3. For instance, a DS1 circuit can support 24 simultaneous 64 Kbps signals, a DS3 circuit can support 28 DS1s, and an NxDS0 can support N channels of 64 Kbps each. CBR circuits 110 and 150 may also represent logical digital signal equivalent interfaces, such as interfaces that convert synchronous transport signals (STS1) into DS3 or virtual tributary (VT1.5) into DS1.

As an overview, IWF 120 and IWF 140 exchange data to establish the CESIP in IP network 130. In various embodiments, a request to establish the CESIP can come through a CBR circuit itself, over a signaling channel, through a management system, etc. Once the CESIP is established, CBR circuit 110 begins providing a data stream to IWF 120 at a constant bit rate. IWF 120 encapsulates the data into IP packets, attaches a predetermined CESIP header to each such IP packet, and feeds the packets into IP network 130 through IP interface 125. The packets travel through tunnel session 165 within tunnel 160 to IP interface 135. From IP interface 135, the packets arrive at IWF 140. IWF 140 reassembles the data stream from the packets and provides the data stream to CBR 150 at the constant bit rate.

Those skilled in the art will recognize that, at various places within an IP network, IP packets are often fragmented into smaller frames and eventually reassembled, wherein a payload for each frame comprises a portion of the original IP packet. As used herein, an IP packet refers to a complete packet which may be fragmented into several frames as it travels through an IP network. In which case, in the illustrated embodiment, a CESIP header is attached to a complete IP packet, and not to individual fragments of the IP packet.

CESIP is preferable to CES over ATM for a variety of reasons. For instance, IP is more widely available than ATM. The cost associated with IP hardware and service is also lower than for ATM. IP has a higher degree of interoperability than ATM in that IP can work with a wider variety of physical networks than ATM. IP's high degree of interoperability and wide availability also improve CES provisioning. For instance, providing an ATM connection from Boston, Mass. to San Jose, Calif. can take days. CES over ATM requires a permanent virtual circuit that affects the actual operational aspects of the ATM network. Numerous physical connections have to be made and verified. IP, in contrast, is homogeneous so CESIP is available almost anywhere. Anywhere that internet access is available, CESIP is available.

Also, IP provides certain features, such as compression, header encryption, and instantaneous failure recovery, that are not readily available in ATM. ATM uses fixed length cells. There is no support for compression in ATM. If useless data, such as silence, is received in a constant rate bit stream, CES over ATM will transmit the useless data. IP, in contrast uses variable length packets. Numerous forms of compression are possible in CESIP to better utilize bandwidth by recognizing useless data and not transmitting it.

Encryption is also more thorough in IP. In ATM, a header destination cannot be encrypted. With access to destination information, CES over ATM can be disrupted in numerous ways, such as flooding the destination with data until the destination fails. In IP, a destination header can be encrypted while exposed on a public network, and only decrypted while in a trusted network.

ATM is connection oriented, so a failure requires reconstruction of a connection, or rerouting, around the failure. ATM re-routing can take a comparatively long time and even cause data loss. IP, in contrast, is connectionless. For any given path, there is virtually always an alternative path. IP does not rely on a particular route. If a route fails, an alternative route is automatically used. Data is not lost. Instead there may merely be a temporary degradation in service due, for instance, to a longer alternate path through the IP network.

The fixed cell size of ATM makes ATM more easy to process through a network than the variable sized packets of IP. But, IP hardware has advanced faster than ATM hardware, allowing CESIP to sustain signal rates at least as fast as CES over ATM.

The present invention overcomes a number of obstacles inherent in IP so that the many advantages of IP can be utilized for circuit emulation services. For instance, compared to ATM, ATM preserves packet order and defines a cell loss ratio through the ATM network. In which case, CES over ATM is relatively straight forward. IP packets, however, are often delivered out-of-order. In fact, IP provides no guarantee of packet delivery whatsoever. In which case, as discussed below, the present invention accounts for these and other properties inherent in IP to provide CESIP.

Figure 2:
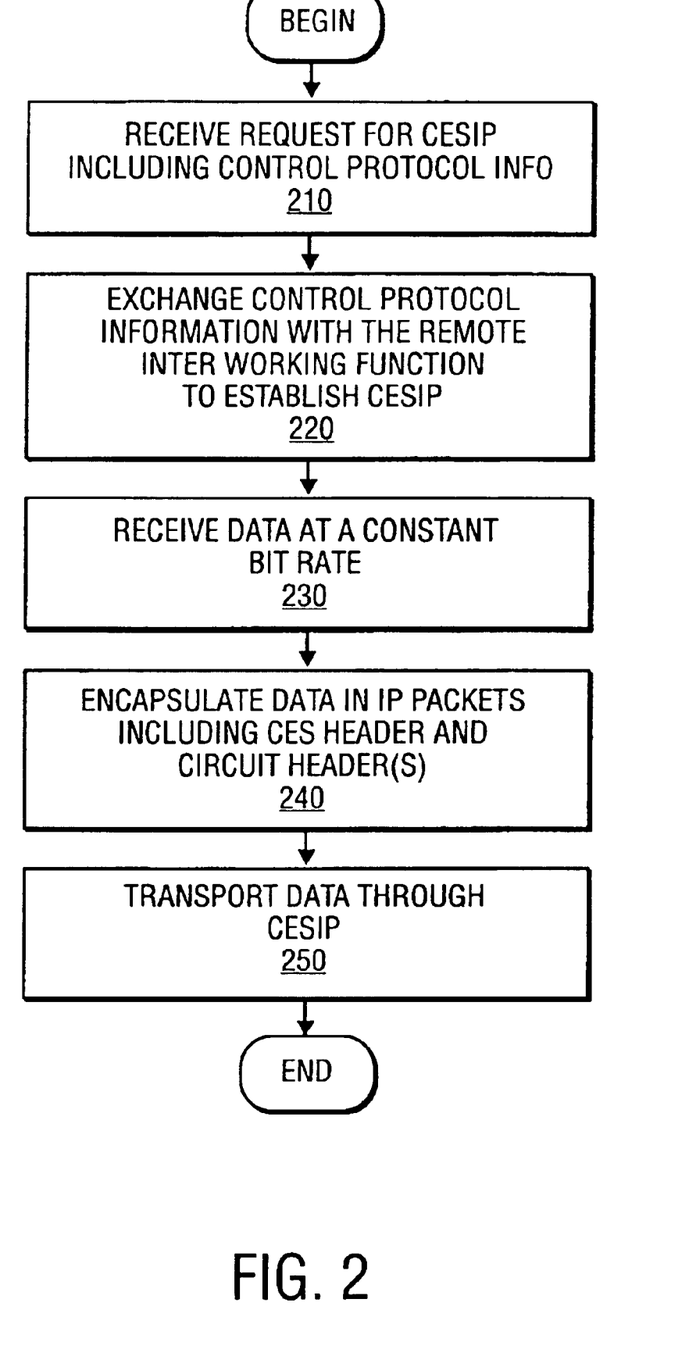
FIG. 2 demonstrates one embodiment of CESIP from a sending interworking function.

FIG. 2 demonstrates one embodiment of CESIP in more detail. In block 210, an interworking function (IWF) receives a request to establish a CESIP. For instance, from a user's perspective, this could be dialing a phone number, submitting a login name, or clicking on a link to a web page. The request can come in any of a number of formats. In one embodiment, the request is received in a user command. In an alternate embodiment, the request is received in an IP frame format. In yet another embodiment, the request is received in a network management protocol such as simple network management protocol (SNMP). In each case, the request may include all or a portion of the control information necessary to establish a CESIP. For instance, a CESIP may already be in place. In which case, the request may just include enough information to identify the remote IWF so that the local IWF can verify that the remote IWF exists on the IP network, and check on the availability of an already configured CESIP.

If a CESIP has not already been established, and the remote IWF exists, the IWFs exchange control protocol information in block 220 to establish a new CESIP. In one embodiment, CESIP builds upon an existing tunneling protocol, layer two tunneling protocol (L2TP). A tunnel transports packets across an intervening network in a way that is intended to be transparent to the end users. L2TP is described in detail in an Internet-Draft titled "Layer Two Tunneling Protocol 'L2TP,'" published June 1999, and available from The Internet Society.

Basically, L2TP is an encapsulation protocol. Data is encapsulated before entering a network and then re-assembled when leaving the network. A tunnel may include several tunneling sessions. That is, L2TP can keep track of several different bit streams between a pair of two IWFs at the same time. Each CESIP uses its own L2TP tunneling session. In alternate embodiments, any number of tunneling protocols can be used.

The control protocol for CES layers on top of the tunnel and tunnel session of L2TP. In one embodiment, the CES control protocol information includes an alarm option, a compression option, an idle pattern option, a check sum option, and a clocking option, a packet size option, a multiple circuit option, a maximum transmit delay, a maximum delay variation, and an encryption option. The CES control protocol is more easily understood in conjunction with the CESIP packet as discussed below.

Once a CESIP has been established, data is received at a constant bit rate in block 230. In block 240, the data is encapsulated into IP packets with additional headers. And, in block 250, the packets are sent through the IP network.

Figure 3:
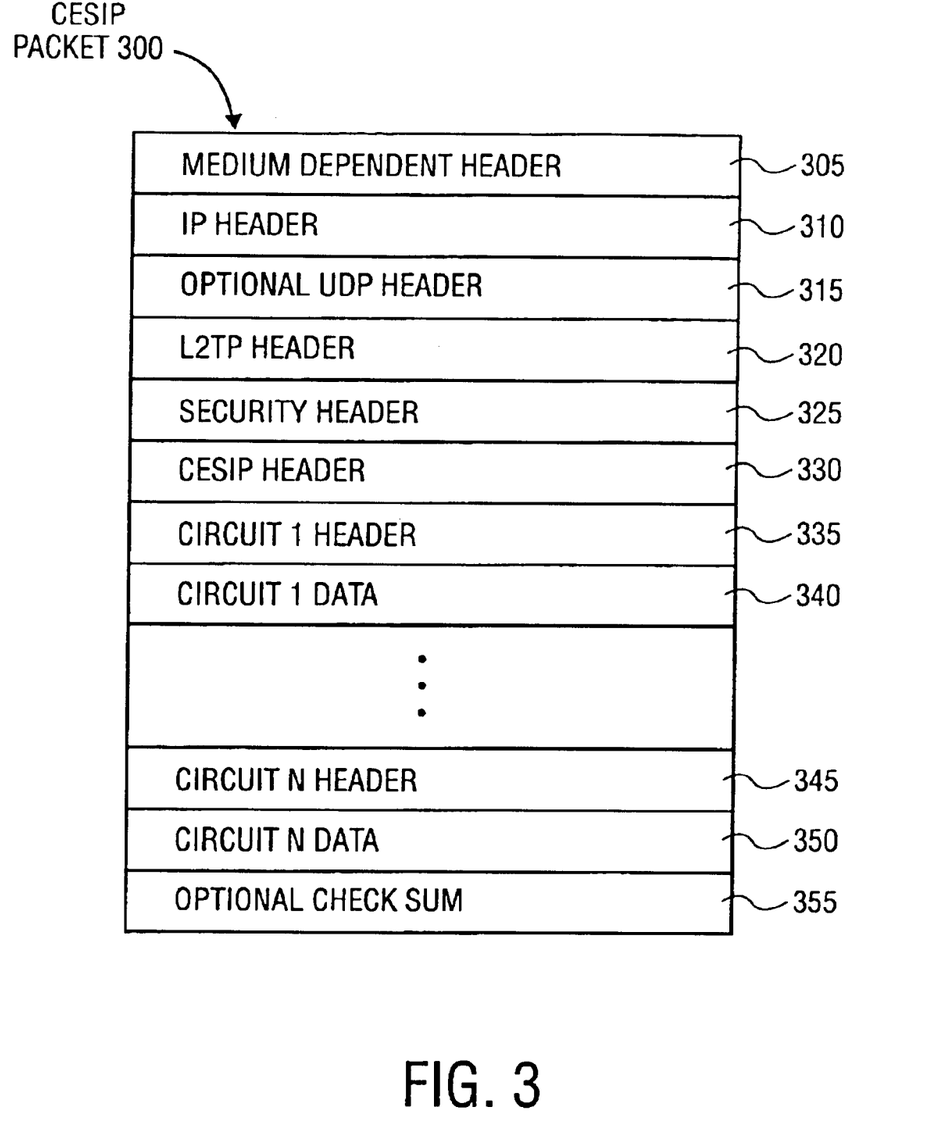
FIG. 3 illustrates one embodiment of a CESIP packet.

FIG. 3 illustrates one embodiment of an encapsulated CESIP packet 300. In the illustrated embodiment, CESIP packet 300 includes a number of known, standard headers including medium dependent header 305, IP header 310, UDP header 315, and L2TP header 320. Medium dependent header 305 depends on the underlying network. For instance, the header may be different if the physical medium is a synchronous optical network (SONET), a copper line, a coaxial cable, or a digital wireless transmission. The header may actually include more than one header such as an ATM header and a SONET line header. The header will change as the packet moves through different types of networks. For instance, each router may internetwork two different kinds of networks. So, at each router, the packet may get repackaged with a different medium dependent header 305.

IP header 310 includes a length indicator for the variable length IP packet. During configuration, the CES control protocol establishes a maximum and minimum packet length. The length may depend on how reliable the network is believed to be. That is, the physical network medium has associated with it a bit error rate, such as one bit error per X megabits. A longer packet has a higher probability of experiencing a bit error. Once a packet is corrupted by a bit error, the packet will likely be dropped. In which case, a more reliable network can support a longer packet size and still maintain a low probability of experiencing a bit error.

Following IP header 310 is user datagram protocol (LJDP) header 315. If L2TP can work directly with IP packets, then UDP header 315 is optional.

Following the standard headers, the illustrated embodiment includes optional security header 325. If it is used, security header 325 may include customized security information, for instance, for authentication and encryption. Alternately, a standardized security header can be used such as the IP security header, IPSec, which includes a separate authentication header section and an encryption header section. If an IPSec header is used, it is usually located between IP header 310 and UDP header 315 in the IP packet rather than following L2TP header 320.

Following security header 325, the illustrated embodiment includes CESIP header 330. In one embodiment, CESIP header 330 contains only a version number for compatibility purposes between hardware at each IWF. Additional information pertaining to individual CESIP circuits is stored in the respective circuit entries as discussed below.

The illustrated embodiment contains N circuit entries. That is, if the multiple circuit option was enabled during the CES control protocol configuration, each packet can contain data from multiple different circuits. For instance, referring to FIG. 1, if five simultaneous data streams are being sent from CBR 110 to CBR 150 at constant bit rates, data from all five data streams can be encapsulated in one CESIP packet. Each circuit entry includes a circuit header section, such as headers 335 and 345, and a circuit data section, such as sections 340 and 350.

Enabling multiple circuits per packet can reduce overhead. For instance, less bits are needed for header information if multiple circuits are included in one packet. Also, less packets need to be routed through the network if multiple circuits are included in one packet. The drawback to packets containing multiple circuits is increased packet length. As discussed above, longer packets have a higher probability of a bit error. In which case, the option to include multiple circuits per packet, as well as the number of circuits per packet, may depend on the estimated reliability of the underlying physical network.

Following the circuit section of CESIP packet 300, the illustrated embodiment includes an optional check sum field 355. During configuration, the CES control protocol determines whether packets will include a check sum. If both users agree that the underlying network is exceptionally reliable, the check sum can be disabled to save some bandwidth. Any number of check sum formats could be used to identify various errors in CESIP packet 300.

Figure 4:
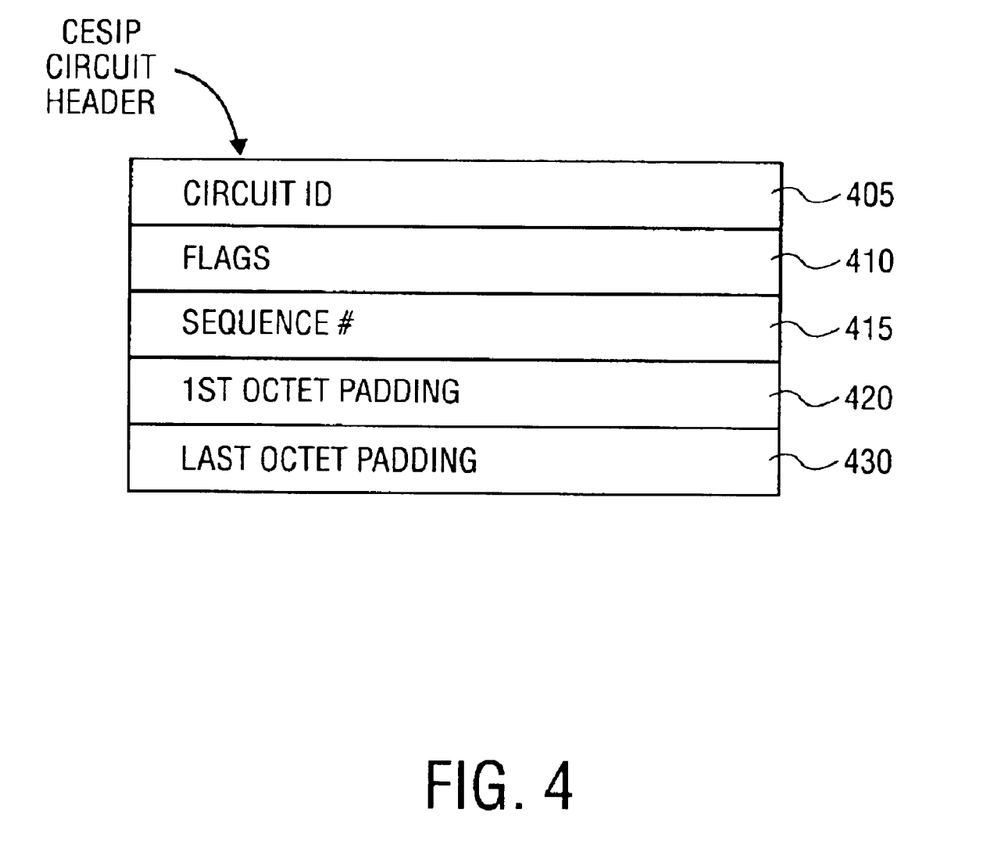
FIG. 4 illustrates one embodiment of a CESIP circuit header.

FIG. 4 illustrates one embodiment a circuit header 335 from FIG. 3 in more detail. Circuit header 335 includes circuit identification 405 to identify which circuit is being emulated. Circuit header 335 also includes flags field 410. One embodiment of flags field 410 includes a compression flag, idle flag, alarm indication signal (AIS) flag, and clocking information. All four of these flags are setup during the CES control protocol configuration. If the compression option is enabled during configuration, then the compression flag for a particular circuit in a packet is set when the circuit data has been compressed. Even if compression is enabled though, not all data is compressible. In which case, the compression flag is only set if data needs to be decompressed at the receiving end. If the compression option is disabled, no attempt is made to compress data and the compression flag is never set.

During configuration, the idle condition option determines how idle conditions are to be treated. An idle condition is usually a predetermined bit pattern that indicates no useful data is being sent. If a sending IWF receives an idle pattern in the input data stream, there is no need to transmit the idle data. Rather, the idle flag can be set to indicate an idle state and the data field for the idle circuit can be dropped off the packet. The frequency at which the packets are sent during idle can also be reduced. The reduced frequency can be set during the control protocol configuration. For instance, during normal emulation of a DS3 circuit, an IWF may send packets at a rate of 8 KHz. During idle however, the IWF may send only one packet per second. Or, in the case of a multiple circuit packet where only one circuit is idle, the idle circuit may be excluded from the packets being sent at 8 KHz and only included in one packet per second.

The alarm indication signal is similar to the idle flag. If an alarm state is detected, such as an abrupt and unexpected stall in the constant input bit stream at an IWF, an alarm pattern should be inserted into the bit stream. Rather than sending the alarm pattern in the data portion of the packet, the data portion can be dropped off and the alarm flag set. Then, the receiving IWF, which was configured by the CES control protocol with the appropriate alarm pattern, can insert the alarm pattern from the receiving end based on the alarm flag. A great deal of network bandwidth can be saved by not sending the alarm pattern over the CESIP. The alarm pattern may be different for different types of signal rates, such as DS3 and the European equivalent. An alarm flag may also reduce the transmission rate similar to the way an idle flag can reduce the transmission rate.

In one embodiment, the clocking flags will only be included if the CES control protocol configuration indicates that the CESIP is asynchronous. The clocking flags are used for clock synchronization between a pair of IWFs. Any number of clocking flag formats could be used. In one embodiment, a synchronous residual time stamp (SRTS) is used. Those skilled in the art will be familiar with clock synchronization using SRTS in CES over ATM. In one embodiment, CESIP supports SRTS in a fashion similar to CES over ATM in that CESIP uses a four bit SRTS with one bit in each alternate packet so that a complete SRTS value is obtained once every eight packets. Alternately, all of the clocking bits can be stored in one packet, or spread over more or fewer packets. In a synchronous CESIP, the clocking flags are not needed because the IWFs are already synchronous.

Returning to FIG. 4, following flag field 410 is sequence number 415. Sequence number 415 is used to reassemble the data stream from the packets of data. In an IP network, packets may take different routes and become out-of-order. The sequence number is used to reassemble the packets in data stream order. In one embodiment, sequence number 415 is an offset value for the packet of data in the stream of data with respect to some reference point. Bits in the incoming bit stream are counted with respect to a reference bit, such as the first bit in a data stream, as the bits are encapsulated. Each packet is given an offset value equal to the bit number of the first bit in the packet with respect to the reference bit. As discussed below with respect to FIG. 6, at the receiving IWF, the packets are buffered so that out of order packets can be assembled in order.

In one embodiment, the offset number is 32 bits. In which case, the offset number wraps around to zero after more than 4 Gbits of data. So, as long as an out-of-order packet does not arrive more than 4 Gbits late, the receiving IWF will either be able to fit it in to the data stream or identify it as an old packet that should be dropped.

In FIG. 4, following sequence number 415 is first octet padding 420 and last octet padding 430. These two values are used to maintain byte alignment in the data encapsulated in the packet. For various reasons, processing speed is increased if byte alignment is maintained. During encapsulation however, packets may not begin and end on byte boundaries, so bits are often added at the beginning and end of the data portion of a circuit within a packet to maintain byte alignment. Therefore, to prevent the padded bits from being added to the output data stream, padding value 420 indicates how many bits in the first byte of the data portion of a circuit are not part of the data stream and padding value 430 indicates how many bits at the end of the last byte of the data portion of the circuit are not part of the data stream so that the bits can be skipped.

Those skilled in the art will recognize that any number of additional approaches can be used to maintain byte alignment. For instance, if the data stream is encapsulated in a byte aligned manner, every bit in a data field will be fill by the data stream so that the padding values 420 and 430 can be excluded from the circuit header format.

Figure 5:
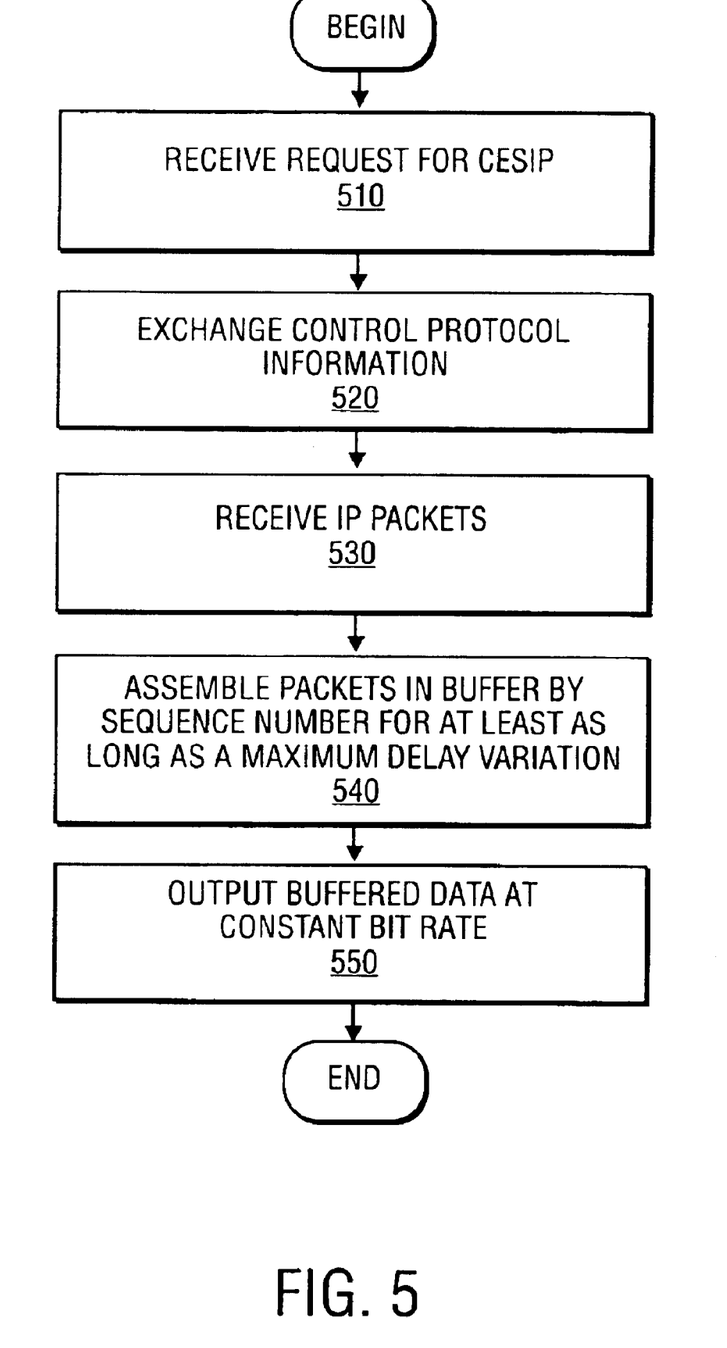
FIG. 5 demonstrates one embodiment of CESIP from a receiving interworking function.

FIG. 5 illustrates one embodiment of a CESIP from the perspective of the receiving interworking function (IWF). In block 510, a request is received to establish a CESIP. For instance, this request can be received over the IP network as an IP packet. In block 520, the same control protocol information is exchanged as discussed above. In block 530, packets are received. As discussed above, the packets may include data from multiple circuits. In block 540, the packets are assembled in a buffer based on the sequence numbers in each circuit header, and in block 550 the buffered data is delivered at the constant bit rate.

Figure 6:
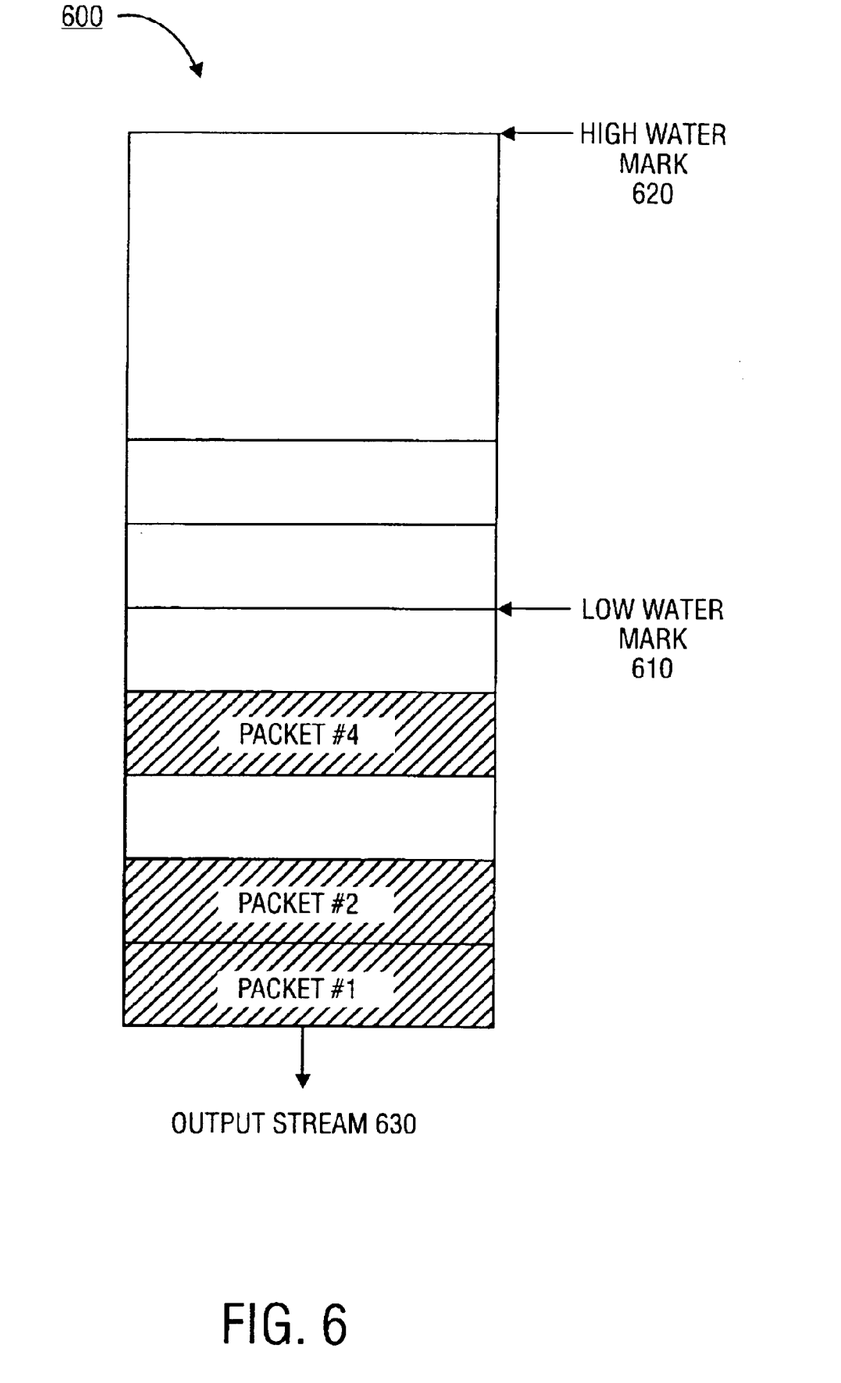
FIG. 6 illustrates one embodiment of a re-assembly buffer.

FIG. 6 illustrates one embodiment of a buffer to reassemble a circuit. The packets cannot be buffered for an extended period of time. For instance, for voice communications, the constant bit rate data can only be delayed for up to 30 to 50 milliseconds in order to maintain a TDM quality connection. Also, buffer 600 should be short enough so that old packets can be identified using, for instance, the offset numbers discussed above. On the other hand, buffer 600 needs to store packets long enough to account for maximum delay variations. For instance, during CES control protocol configuration, a maximum delay variation is agreed upon by the IWFs, and may be in the neighborhood of 10 milliseconds.

Delay variation is dependent upon network traffic. If a large volume of traffic is passing through the network, routers are likely to have longer delays because packets have to sit in longer queues to be processed. Delay variation is also dependent upon the path that a packet takes through the IP network. Different paths usually have different propagation delays. Different propagation delays can cause packets to arrive out of order. By allowing packets to accumulate for at least as long as the maximum delay variation, the chances of loosing packets due to delay variation are greatly reduced.

In the illustrated embodiment, buffer 600 includes a low water mark 610 and a high water mark 620. Bit stream data are accumulated until low water mark 610 is reached before transmitting output stream 630. If high water mark 620 is reached, buffer 600 has overflowed. Data must be discarded if buffer 600 has overflowed. In one embodiment and entire buffer content is discarded. Alternately, data is discarded down to below low water mark 610. If data is lost, a predetermined bit sequence can be inserted. For instance, unstructured DS3 uses a framed 1010 . . . alarm bit pattern. E3, the European equivalent, uses a 1111 . . . bit pattern.

In various embodiments, packet routing techniques can be used to increase the likelihood that packets will follow the same path through the network and, therefore, reduce large delay variation and consequently data loss due to late packet arrival. Those skilled in the art will be familiar with routing techniques such as source routing, RSVP (resource reservation protocol), MPLS (multi-protocol label switching), and provisioned flows using a packet filter.

Figure 7:
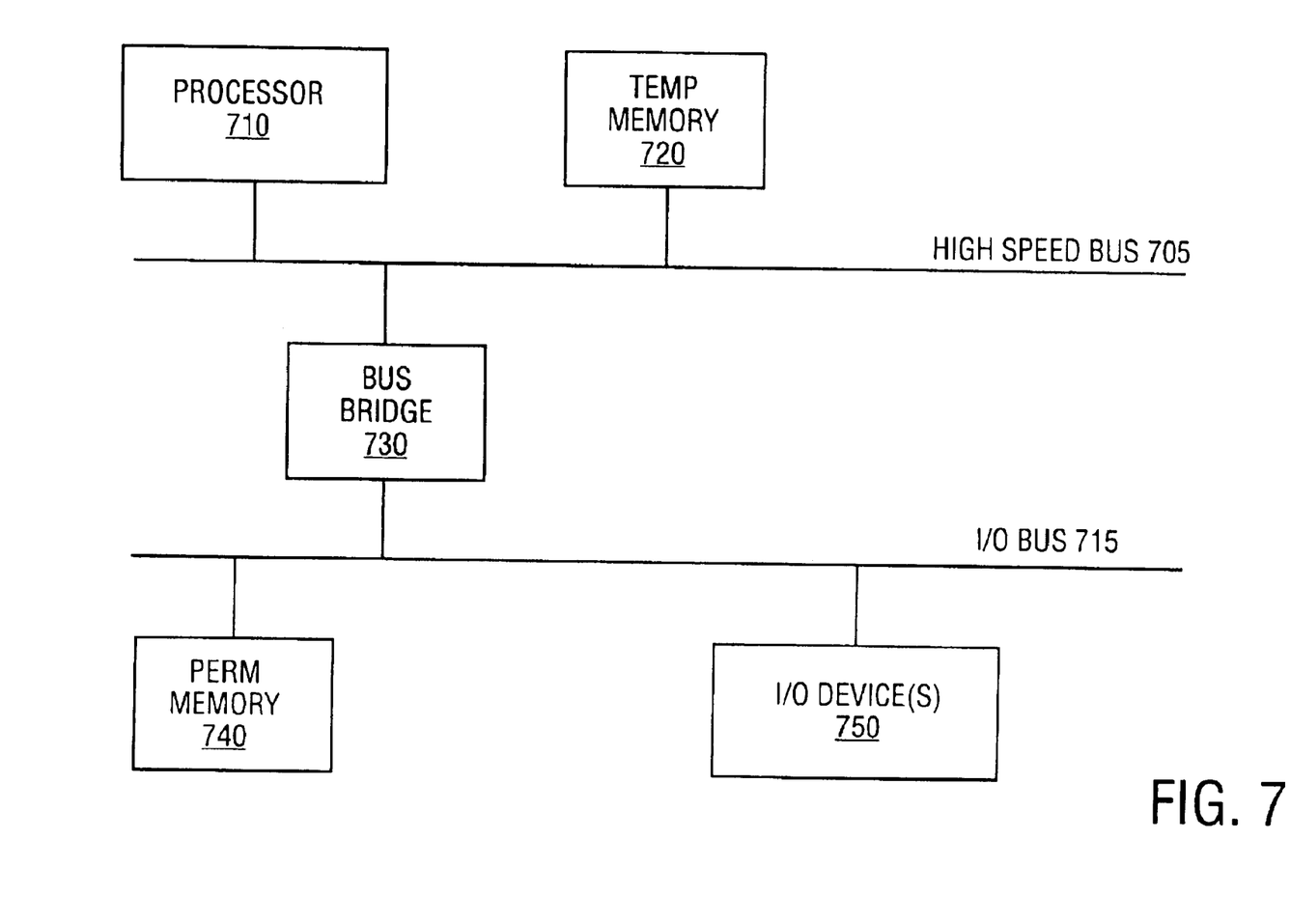
FIG. 7 illustrates one embodiment of a hardware system

FIG. 7 illustrates one embodiment of a hardware system intended to represent a broad category of computer systems such as personal computers, workstations, and/or embedded systems. In the illustrated embodiment, the hardware system includes processor 710 coupled to high speed bus 705, which is coupled to input/output (I/O) bus 715 through bus bridge 730. Temporary memory 720 is coupled to bus 705. Permanent memory 740 is coupled to bus 715. I/O device 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

Figure 8:
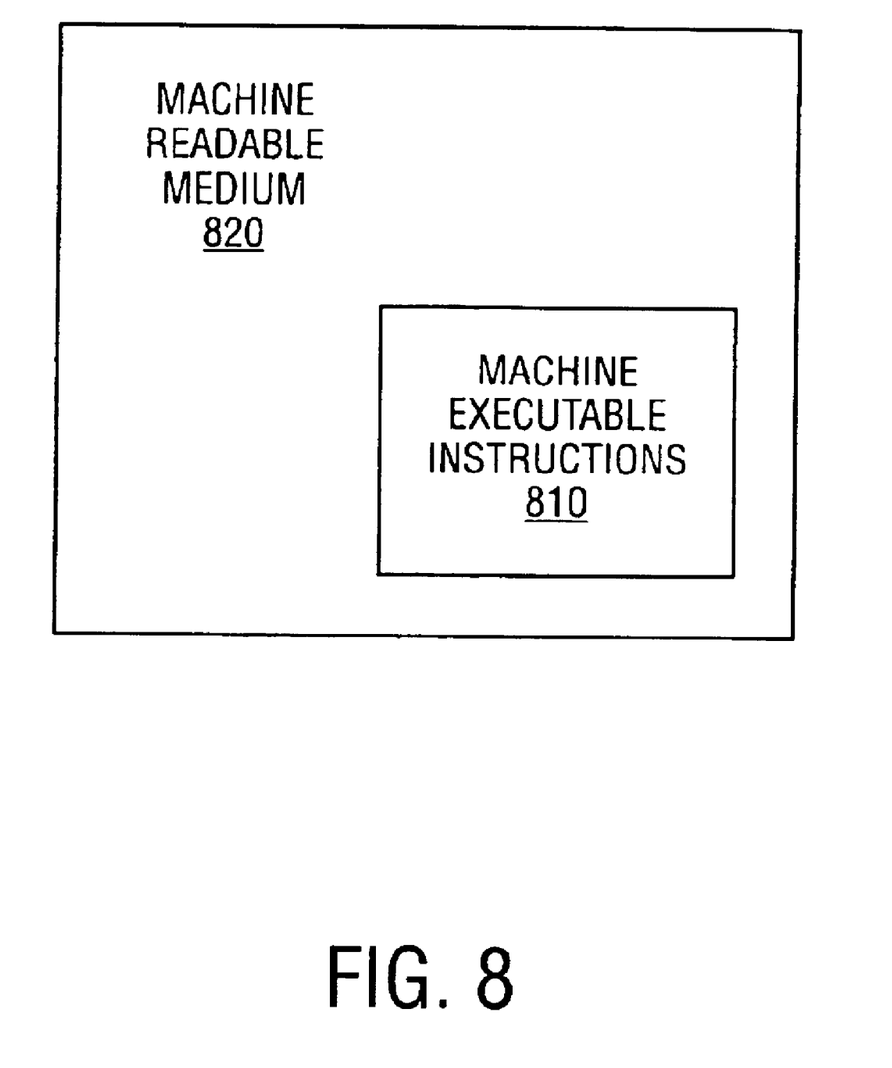
FIG. 8 illustrates one embodiment of a machine readable storage medium.

In one embodiment, the circuit emulation service over internet protocol (CESIP), as described above, is implemented using one or more computers such as the hardware system of FIG. 7. Where more than one computer is used, the systems can be coupled to communicate over an external network, such as a local area network (LAN), an IP network, etc. In one embodiment, the present invention is implemented as software routines executed by the computer(s). For a given computer, the software routines can be stored on a storage device, such as permanent memory 740. Alternately, as shown in FIG. 8, the software routines can be machine executable instructions 810 stored using any machine readable storage medium 820, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 750. The instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the CESIP. In another example, the CESIP could be implemented in one or more ASICs on additional circuit boards and the circuit boards could be inserted into the computer(s) described above. In another example, field programmable gate arrays (FPGAs) or static programmable gate arrays (SPGA) could be used to implement the present invention. In yet another example, a combination or hardware and software could be used to implement the present invention.

Thus, a circuit emulation service over internet protocol is described. Numerous specific details have been set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description have been presented using terminology commonly employed by those skilled in the art to convey the substance of their work to others skilled in the art. Also, parts of the description have been presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations have been described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:

configuring a circuit emulation service (CES) over an internet protocol (IP) network based on properties of the IP network, the CES being configured to establish a tunnel between a local interworking function and a remote interworking function;

encapsulating data received at a constant bit rate at the local interworking function into a plurality of IP packets configured according to the CES, wherein the plurality of IP packets includes a first IP packet having a variable length; and transporting the IP packets from the local interworking function to the remote interworking function according to the CES;

wherein configuring the CES comprises exchanging a plurality of CES control protocol (CESCP) information between the local interworking function and the remote interworking function; and wherein the plurality CESCP information comprises at least one of a circuit identification and an internet protocol address for the local and remote interworking functions, alarm indication signal options, idle condition options, a clock option, a check sum option, a minimum and a maximum circuit size, a multiple circuits option, a maximum transition delay, a maximum delay variation, a compression option, and an encryption option.

2. A method comprising:

configuring a circuit emulation service (CES) over an internet protocol (IP) network based on properties of the IP network, the CES being configured to establish a tunnel between a local interworking function and a remote interworking function;

encapsulating data received at a constant bit rate at the local interworking function into a plurality of IP packets configured according to the CES, wherein the plurality of IP packets includes a first IP packet having a variable length; and transporting the IP packets from the local interworking function to the remote interworking function according to the CES;

wherein encapsulating the data comprises attaching a CES header to each IP packet; and wherein the CES header comprises a version number for compatibility between the local interworking function and the remote interworking function.

3. A method comprising:

configuring a circuit emulation service (CES) over an internet protocol (IP) network based on properties of the IP network, the CES being configured to establish a tunnel between a local interworking function and a remote interworking function;

encapsulating data received at a constant bit rate at the local interworking function into a plurality of IP packets configured according to the CES, wherein the plurality of IP packets includes a first IP packet having a variable length;

transporting the IP packets from the local interworking function to the remote interworking function according to the CES buffering the plurality of IP rackets received from the remote interworking function for at least as long as a maximum delay variation; and outputting payloads of the plurality of received IP packets at the constant bit rate;

wherein the maximum delay variation comprises delay due to out-of-order IP packet delivery.

4. A method comprising:

configuring a circuit emulation service (CES) over an internet protocol (IP) network based on properties of the IP network, the CES being configured to establish a tunnel between a local interworking function and a remote interworking function;

encapsulating data received at a constant bit rate at the local interworking function into a plurality of IP packets configured according to the CES, wherein the plurality of IP packets includes a first IP packet having a variable length and each IP packet further comprises at least one circuit, each circuit comprising at least one circuit header; and transporting the IP packets from the local interworking function to the remote interworking function according to the CES, wherein the at least one circuit header comprises at least one of a circuit identification, a flag field, a sequence number, a first octet padding value, a last octet padding value, and a data field, and wherein the flag field comprises at least one of a compression flag, an idle flag, an alarm indication signal flag, and a clocking information flag.

5. The method of claim 4 wherein the clocking information flag comprises a synchronous residual time stamp (SRTS) value.

6. A method comprising:

configuring a circuit emulation service (CES) over an internet protocol (IP) network based on properties of the IP network, the CES being configured to establish a tunnel between a local interworking function and a remote interworking function;

encapsulating data received at a constant bit rate at the local interworking function into a plurality of IP packets configured according to the CES, wherein the plurality of IP packets includes a first IP packet having a variable length and each IP packet further comprises at least one circuit, each circuit comprising at least one circuit header; and transporting the IP rackets from the local interworking function to the remote interworking function according to the CES.

wherein the at least one circuit header comprises at least one of a circuit identification, a flag field, a sequence number, a first octet padding value, a last octet padding value, and a data field, and wherein the sequence number indicates a starting position of a first bit of data in a corresponding circuit with respect to a reference point in a corresponding bit stream.

7. A method, comprising:

configuring a circuit emulation service (CES) over an internet protocol (IP) network based on properties of the IP network, the CES being configured between a first interworking function to a second interworking function;

encapsulating data received at a constant bit rate at the first interworking function into a first plurality of IP packets configured according to the CES;

encapsulating data received at the constant bit rate at the second interworking function into a second plurality of IP packets configured according to the CES;

transporting the first plurality of IP packets from the first interworking function to the second interworking function according to the CES;

transporting the second plurality of IP packets from the second interworking function to the first interworking function according to the CES;

buffering the second plurality of IP packets at the first interworking function for at least as long as a maximum delay variation, said maximum delay variation comprising delay due to out-of-order IP packet delivery;

outputting payloads of the second plurality of IP packets at the constant bit rate; buffering the first plurality of IP packets at the second interworking function for at least as long as the maximum delay variation; and outputting payloads of the first plurality of IP packets at the constant bit rate.

8. An apparatus, comprising:

means for configuring a circuit emulation service (CES) over an internet protocol (IP) network based on properties of the IP network, the CES being configured between a first interworking function to a second interworking function;

means for encapsulating data received at a constant bit rate at the first interworking function into a first plurality of IP packets configured according to the CES;

means for encapsulating data received at the constant bit rate at the second interworking function into a second plurality of IP packets configured according to the CES;

means for transporting the first plurality of IP packets from the first interworking function to the second interworking function according to the CES;

means for transporting the second plurality of IP packets from the second interworking function to the first interworking function according to the CES;

means for buffering the second plurality of IP packets at the first interworking function for at least as long as a maximum delay variation, said maximum delay variation comprising delay due to out-of-order IP packet delivery;

means for outputting payloads of the second plurality of IP packets at the constant bit rate;

means for buffering the first plurality of IP packets at the second interworking function for at least as long as the maximum delay variation; and means for outputting payloads of the first plurality of IP packets at the constant bit rate.

* * * * *